United States Patent [19]

Rohwer et al.

[11] Patent Number: 4,772,481

[45] Date of Patent: Sep. 20, 1988

[54] RUMINANT FEED PRESERVATIVE COMPOSITIONS

[75] Inventors: Gary L. Rohwer, Parma; Charles E. Ware, Boise, both of Id.

[73] Assignee: Frontier Feeds, Inc., Boise, Id.

[21] Appl. No.: 32,914

[22] Filed: Mar. 31, 1987

Related U.S. Application Data

[63] Continuation of Ser. No. 708,470, Mar. 5, 1985, abandoned.

[51] Int. Cl.$^4$ .............................................. A23K 1/00
[52] U.S. Cl. .................... 426/335; 426/532; 426/658; 426/807
[58] Field of Search ............... 426/331, 335, 532, 623, 426/630, 636, 807, 54, 658

[56] References Cited

U.S. PATENT DOCUMENTS

| | | | |
|---|---|---|---|
| 1,708,330 | 4/1929 | Robinson et al. | 426/335 |
| 2,502,376 | 3/1950 | Gnadinger | 426/335 |
| 2,522,535 | 9/1950 | Pryor | 426/335 |
| 2,701,201 | 2/1955 | Hamm | 426/335 |
| 2,707,682 | 5/1955 | Arkens | 426/335 |
| 2,890,120 | 6/1959 | Makower | 426/269 |
| 3,033,685 | 5/1962 | Hollenbeck | 426/53 |
| 3,202,514 | 8/1965 | Burgess et al. | 426/74 |
| 3,608,085 | 9/1971 | Papworth | 514/557 |
| 3,682,653 | 8/1972 | Mommer | 426/309 |
| 3,961,092 | 6/1976 | Forest et al. | 426/331 |
| 3,982,028 | 9/1976 | Bellingham | 426/69 |
| 4,079,150 | 3/1978 | Beck et al. | 426/54 |
| 4,220,661 | 9/1980 | Huitson | 514/557 |

FOREIGN PATENT DOCUMENTS 685133 9/1979 U.S.S.R. .
2120924 12/1983 United Kingdom .

OTHER PUBLICATIONS

Viitanen et al., Chemical Abstracts, vol. 85, (1976), #92439f.
Viitanen et al., Chemical Abstracts, vol. 88, (1978), #61295p.
Viitanen et al., Chemical Abstracts, vol. 91, (1979), #191727d.
Joonas et al., Chemical Abstracts, vol. 92, (1980), #4979y.
Davidson et al., 1973, Canadian Journal of Plant Science 53:75–79.
Wilkins et al., 1974, Proceedings XII International Grassl. Cong. 3:674–690.
Ettala et al., Annales Agricultura Fenniae, 14, 286–303 (1975).
Ettala et al., Annales Agricultura Fenniae, 14, 304–318 (1975).
Szara, Chemical Abstracts, vol. 97, (1982), #161352j.
Davis, Chemical Abstracts, vol. 100, (1984), #101904m.
Fermentation of Silage, A Review, National Feed Ingredients Association, 1978, pp. 117–141, 550–152, 178–179, 201–226.

*Primary Examiner*—R. B. Penland

[57] ABSTRACT

A storage stable premix of formaldehyde, formic acid, methanol and water and preferably also surfactant is admixed with sugar solution, preferably molasses, and water, to form composition for preserving feeds for ruminants.

9 Claims, No Drawings

RUMINANT FEED PRESERVATIVE COMPOSITIONS

This application is a continuation of application Ser. No. 708,470, filed Mar. 5, 1985, now abandoned.

TECHNICAL FIELD

This invention is directed to a premix and to composition formed therefrom for preserving feeds for ruminants and to method for preserving said feeds. The feeds referred to include wet and dry fodders, silage, and wet by-product animal feeds. The wet by-product animal feeds include spent grains including brewers grain, citrus, vegetable and fruit waste, sugar beet pulp, and other wet by-product animal feeds.

The term "fodder" is used herein to mean the whole plant which is cut growing and dried for use for animal feed. The term "dry fodder" means the fodder contains by weight 60% moisture or less. The term "wet fodder" means the fodder contains more than 60% by weight moisture.

The term "grain" is used herein to mean the seed portion of plants, which seed portion is used as animal feed. The term "brewers grain" means the grain residue left as a by-product of the beer, liquor, and sugar industries.

The term "silage" is used herein to mean fodder, grain or other food material stored green and fermented aerobically in a desirable way whereby lactic acid forms.

The invention is particularly directed at feeds for ruminants.

BACKGROUND OF THE INVENTION

Turning firstly to fodders, alfalfa hay and grass fodders make up a large percentage of animal feed in the United States. Hay is normally air dried and sun cured to a moisture level of approximately 12%. Otherwise, the hay must be used within a short time or it molds. Up to 25% of the feed value of a hay crop can be lost to mold and heat damage. Rain can ruin the entire crop. The drying time normally ranges from one or two days in hot dry climates to two weeks in wet cool climates. In order to reduce drying time and minimize the possibility of mold and rain damage, products are utilized which break down the wax layer of the stems letting air get to the inside sooner than otherwise whereby drying occurs more rapidly. These products often include mold inhibitors thereby allowing drying to a moisture content higher than 12% resulting in further speeding up of drying and in the reduction of leaf shatter and feed value loss which occurs on baling drier hay. The most popular liquid products are expensive and rely for mold growth inhibition on propionic acid, a relatively weak mold growth inhibitor. Thus, there is a need for a less expensive preservative composition and/or a composition which includes a more powerful mold growth inhibitor which would allow drying to a lesser moisture content.

Turning now to silage, hay which is cut green, and chopped and ensiled normally starts out containing 30-40% dry matter. Unless preserving additives are utilized, mold growth can occur resulting in production of enzymes which reduce complex carbohydrates to simple sugars and bacteria thriving on the sugars attack protein turning it into indigestible material, resulting in a loss of 25-35% of the dry matter, and a bad odor is produced. It is known to utilize formic acid to inhibit mold growth and preserve carbohydrate, and it is known to use formaldehyde to inhibit mold growth and preserve protein. It is also known to use methanol in combination with formaldehyde to stabilize the formaldehyde against paraformaldehyde formation, and it is known that methanol has some preservative function. It is also known to use the combination of formic acid and formaldehyde but usually such use is with a composition containing more formic acid than formaldehyde. Chemical Abstracts 85:92439f discloses this type of composition. Russian Patent No. 685,133 discloses this type of composition which also includes methanol. It has been found herein that compositions with elevated usage of formic acid result in a reduction in the animal's voluntary intake. U.K. Patent Application No. 2,120,924A discloses a preservative composition including an excess of formaldehyde over formic acid which does not include methanol and which includes methyl vinyl ether/maleic anhydride copolymer to suppress formaldehyde vaporization; the composition is applied in relatively large quantities and the copolymer in it has no food value. Thus there is a need for a preservative composition including more formaldehyde than formic acid with the advantages of this combination which is also protected against paraformaldehyde formation and wherein vaporization is suppressed by an ingredient with food value and which is effectively used in relatively low amounts.

Turning now to wet by-product animal feeds, e.g. brewers grain, these start to mold within a few days unless subjected to drying which costs approximately ton. Currently, such feeds are normally not chemically preserved. Thus, there is a need for preservative compositions to reduce or eliminate drying cost.

There is a further need for compositions which will effectively preserve dry feeds. The problem in respect to dry feeds is that the preservative compositions will not penetrate into these and no additive has been included to overcome this problem. While surfactants are marketed which are asserted to implement penetration into feeds of molasses added as a carbohydrate supplement, such surfactants are not known to have been used heretofore to aid penetration of preservative composition into dry feeds.

SUMMARY OF THE INVENTION

An advantageous premix has been discovered herein for providing inexpensive compositions for preserving feeds for ruminants, including fodders, silages and grains. The premix contains particular levels and ratios of formaldehyde, formic acid and methanol whereby mold growth is effectively and powerfully inhibited and loss of carbohydrate and protein and dry matter is minimized without any reduction in voluntary intake and wherein paraformaldehyde formation is prohibited. The premix is appropriately admixed with sugar solution, preferably molasses, which not only suppresses formaldehyde vaporization but also adds carbohydrates to the feed. Compositions herein for preserving fodders enable drying so that baling can be carried out at moisture contents greater than the standard 12%, e.g. at a moisture content as high as 27%, with no mold growth, and with significantly less leaf shatter loss so that dry matter losses can be restricted to 5% or less. In preferred embodiments surfactant is added to the premix or preservative composition to promote penetration into dry fodders and other dry feeds whereby they are effectively protected. The preservative compositions herein for use with ensiled feed allow ensiling at moisture levels of 80% and higher instead of the conventional 60-70% moisture levels so that drying time after cutting can be reduced. Preservative compositions herein protect 70% moisture content brewers grain against mold growth for up to 90 days whereas as indicated above mold growth normally starts within a few days. It has been discovered herein that the preservative compositions herein are effectively used in significantly lower amounts than those conventional for preservative compositions based on formaldehyde and/or formic acid.

The premix herein is for admixture with sugar solution to provide storage stable compositions for application to feeds for ruminants to acidify and preserve such and comprises (a) from about 25% to about 35% by weight formaldehyde, (b) formic acid in an amount such that the weight ratio of formaldehyde to formic acid ranges from about 1.3:1 to about 1.8:1, (c) methanol in an amount such that the weight ratio of formaldehyde to methanol ranges from about 2:1 to about 6:1, and (d) water.

In one embodiment, the premix additionally contains by weight from about 0.2% to about 3% surfactant.

Preservative composition for application to feeds for ruminants to acidify and preserve such is appropriately made up by admixing the premix with sugar solution. Preferably, the concentration of the sugar solution which is admixed is at least about 60 degrees Brix. In many cases additional water is also admixed. The composition comprises premix and sugar solution in an amount such that the weight ratio of sugar solids to premix ranges from about 0.2:1 to about 4:1 and the total amount of water in the composition ranges from about 10% to about 65% by weight of the composition. These compositions provide good preservative function even at the low application rates of about 3 to about 30 pounds per ton which are preferred herein.

Preservative composition for application to fodder is readily made up by admixing premix with sugar solution and water. The composition comprises premix and sugar solution in an amount such that weight ratio of sugar solids to premix ranges from about 0.2:1 to about 2:1 and the total amount of water in the conposition ranges from about 10% to about 65% by weight of the composition. Preferably the concentration of the sugar solution which is admixed is at least about 60 degrees Brix, and additional water is admixed so that the composition contains water besides that which is in the premix and in the admixed sugar solution in an amount ranging from about 20% to about 45% by weight of the composition. In the case of composition for application to dry fodder, the preservative composition is made up to also contain surfactant in an amount ranging from about 0.025% to about 0.5% by weight of the composition to enhance penetration of the preservative composition into the dry fodder. This is carried out by utilizing the embodiment of the premix which includes surfactant or by admixing surfactant at the time of making up the preservative composition. The preservative compositions for application to fodders are applied in an effective amount which very preferably is from about 5 to about 10 pounds of said composition per ton of fodder.

Preservative composition for use as an ensilement additive is readily made up by admixing premix with sugar solution and water. The composition comprises premix and sugar solution in an amount such that the weight ratio of sugar solids to premix ranges from about 1.5:1 to about 4:1 and the total amount of water in the composition ranges from about 10% to about 65% by weight of the composition. Preferably, the concentration of the sugar solution which is admixed is at least about 60 degrees Brix and additional water is admixed so that the composition contains water besides that which is in the premix and in the admixed sugar solution in an amount ranging from about 20% to about 45% by weight of the composition. The preservative compositions for use as ensilement additives are applied to the green material in an effective amount which very preferably is from about 20 to about 30 pounds of said composition per ton of green material.

Preservative composition for use for preserving wet by-product animal feeds such as brewers grain is readily made up by admixing the premix with sugar solution. Preferably the concentration of the sugar solution which is admixed is at least about 60 degrees Brix. The composition comprises premix and sugar solution in an amount such that the weight ratio of sugar solids to premix ranges from about 1.5:1 to about 4:1 and the total amount of water in the composition ranges from about 5% to about 40% by weight of the composition. The preservative compositions for use for application to brewers grain are applied in an effective amount which preferably is from about 10 to about 20 pounds of a composition per ton of brewers grain.

The preservative compositions herein provide feed with high dry matter conversion.

DETAILED DESCRIPTION

Usually, the premix herein comprises by weight
(a) from about 25% to about 35% formaldehyde,
(b) from about 15% to about 25% formic acid,
(c) from about 5% to about 15% methanol, and
(d) from about 35% to about 50% by weight water.

In a preferred composition, the weight ratio of formaldehyde to formic acid in the premix ranges from about 1.4:1 to about 1.7:1.

In the premix compositions herein, the components are combined in a novel way to provide synergistic results. The formaldehyde functions in the ultimate preservative compositions to preserve protein and inhibit mold growth. Methanol is included to protect the formaldehyde from reacting to form less effective paraformaldehyde. The formic acid is a very powerful mold growth inhibitor and directly acidifies the feed to which it is applied thereby functioning to preserve carbohydrate and dry matter. The formic acid has some paraformaldehyde formation inhibiting function and thus reduces the percentage of methanol in the composition.

The percentages of formaldehyde specified for the premix provide a composition which is readily handled and which is readily diluted to provide effective preservative composition which is readily applied for preservative purposes.

The amount of methanol utilized depends on the climate where the premix and preservative compositions are to be stored or shipped prior to use. The methanol functions to prevent the composition from freezing as freezing fosters paraformaldehyde formation. Thus in the North of the United States the ratio of formaldehyde to methanol can be, for example 2:1 to 3:1 whereas in the South the ratio is appropriately, for example, 4:1 to 6:1.

The broad weight ratio range of formaldehyde to formic acid of from about 1.3:1 to about 1.8:1 is very important. If a ratio greater than 1.8:1 is utilized resulting in too high a level of formaldehyde in the preservative compositions, the formaldehyde can irreversibly bind protein. If a ratio less than 1.3:1 is utilized resulting in too high a level of formic acid in the preservative compositions, the result is a reduction in the voluntary intake of the animals being fed. Furthermore, at the selected ratio significant negative effects do not occur even if the application rates depart from the ranges set forth above while this is not true at other ratios.

Turning now to the surfactant ingredient which is utilized in the premix in the embodiment where the premix can be used to form preservative compositions for effective penetration into and preservation of dry feed material (60% by weight moisture or less) or where surfactant ingredient is not in the premix but is added in making up composition for preserving dry feed material, such surfactants can be any of the emulsifiers normally approved for or utilized in foods, e.g. fatty mono- or diglycerides, ethoxylated or propoxylated monoor diglycerides, acetylated mono- or diglycerides, lactylated mono- or diglycerides, citric acid esters of mono- or diglycerides, sorbitan esters, sugar esters, polysorbates and polyglycerol esters. If stronger penetration is desired, surfactants with higher HLB's can be utilized e.g. anionic surfactants such as sulfated fatty alcohols or sulfonated alkylbenzenes or nonionic surfactants such as polyethylene oxide condensates of alkyl phenols or condensation products of aliphatic alcohols with ethylene oxide, or condensation products of ethylene oxide with the product resulting from reaction of propylene oxide and ethylene diamine. Besides functioning to enhance penetration, the surfactants also can function as emulsifiers for inclusion in the premix or preservative compositions of ingredients normally insoluble therein. Moreover, the surfactant additionally helps the incorporation of the sugar solution into the composition thereby desirably helping in reduction of the viscosity thereof and aiding in its admixing.

The premix is readily made up by admixing the ingredients in any order. The formaldehyde is readily purchased in aqueous solution containing appropriate amounts of methanol. It is convenient to start with the water ingredient and add the other ingredients to it while agitating. The admixing is readily carried out in any convenient vessel including the containers in which the product is to be shipped, e.g. 55 gallon drums, or a tank truck equipped with a recirculation pump.

Turning now to the preservative compositions herein, in broad scope these comprise (a) from about 1.0 to about 18% by weight formaldehyde, (b) formic acid in an amount such that the weight ratio of formaldehyde for formic acid ranges from about 1.3:1 to about 1.8:1, preferably from about 1.4:1 to about 1.7:1, (c) methanol in an amount such that the weight ratio of formaldehyde to methanol ranges from about 2:1 to about 6:1, (d) from about 23% to about 74% by weight sugar solids, preferably added in the form of molasses; and (e) from about 10% to about 65% by weight water.

The composition in the above paragraph is also powerful fly larvacide and has independent utility in any fly breeding environment to reduce the fly population.

In the case where the preservative composition is to be used on dry feeds (60% moisture or less), it should also contain from about 0.025% to about 0.5% surfactant as described above.

The sugar solution includes any of those which have food value and facilitate handling and have no deleterious effect. Suitable sugar solutions include, for example, invert syrup, refiner's syrup, corn syrup, aqueous solutions of dextrose or honey. Preferably, the sugar solution is molasses which is readily available and conveniently used in concentrations of 60 degrees Brix or 79.5 degrees Brix. Mixtures of the aforementioned sugar solutions can be utilized. As is sometimes done in the cattle feed industry, part of the molasses or other sugar solution can be replaced by ammonium and calcium lignin sulfonates (from the wood industry) but it is preferable not to do this as these have less food value than sugar solutions. The sugar solution ingredient functions as a carrier and a source of readily usable carbohydrates which have food value and in the case of silage help drive the fermentation in a desirable route (i.e. to produce lactic acid). Very importantly the sugar solution suppresses volatilization of formaldehyde and hinders paraformaldehyde formation.

As is indicated above, the preservative compositions herein are readily formed by admixing premix with sugar solution and in many cases additional water. If desired however, the preservative compositions herein can be prepared by admixing the individual ingredients, i.e. without utilizing the premix as one ingredient.

The preservative compositions herein are readily prepared by admixing the ingredients in any order, e.g. utilizing any suitable mixing vessel including shipping and/or storage containers including 55 gallon drums and tank trucks equipped with recirculation pumps.

The preservative compositions herein are powerful mold inhibitors. They preserve protein and complex carbohydrates, minimize formation of indigestible material, maximize retention of dry matter and prevent bad odor formation. The result is that the feeds treated with preservative herein provide significantly higher dry matter conversions and weight gain in the animals fed compared to where untreated feeds are utilized. The preservative compositions herein are also powerful fly larvacides and reduce the fly population that would ordinarily be present.

Turning now to the compositions herein specifically adapted for treating fodders, such fodders include, for example, hays derived from alfalfa, grasses, clover, trifoil, and vetch. Preferably, the composition contains sugar solution in an amount such that the weight ratio of sugar solids to premix preferably ranges from about 0.25:1 to about 0.4:1. Usually, the composition for application to fodders comprises from about 1.0 to about 18% by weight formaldehyde, formic acid in an amount such that the weight ratio of formaldehyde to formic acid ranges from about 1.3:1 to about 1.8:1, preferably from about 1.4:1 to about 1.7:1, methanol in an amount such that the weight ratio of formaldehyde to methanol ranges from about 2:1 to about 6:1, from about 23% to about 74% by weight sugar solids, preferably added in the form of molasses, and from about 10% to about 65% by weight water. The composition is readily applied to fodder, preferably in an amount ranging from about 3 to about 10 pounds of composition per ton of fodder, e.g. by spraying at the cutter bar or from an airplane just prior to cutting or by spraying on a windrow as the cut material is leaving the cutter or just as the material is entering the baler. The compositions herein inhibit mold growth even though the fodder is baled at 27% moisture content and provide better dry matter conversions as cattle fed with treated fodder have at least 7.5% more weight gain per pound of feed than cattle fed with untreated fodder.

Turning now to the compositions herein specifically adapted for use as an ensiling additive, the silage material includes for example, the materials specifically listed above as fodders and additionally includes corn. Preferably, the compositions contain sugar solution in an amount such that the weight ratio of sugar solids to premix ranges from about 2.5:1 to about 3.5:1. Usually, the composition for use as an ensiling additive comprises from about 1.0% to about 18% by weight formaldehyde, formic acid in an amount such that the weight ratio of formaldehyde to formic acid ranges from about 1.3:1 to about 1.8:1, preferably from about 1.4:1 to about 1.7:1, methanol in an amount such that the weight ratio of formaldehyde to methanol ranges from about 2:1 to about 6:1, from about 23% to about 74% by weight sugar solids, preferably added in the form of molasses, and from about 10% to about 65% by weight water. The composition is readily applied preferably at a level ranging from about 20 to about 30 pounds per ton of green material, e.g. during cutting, from the chopper, on the chopped green material in the truck hauling it to the silage site or on the pile of chopped green material unloaded from the truck just prior to its deposit in the silage pit. The applied preservative composition prevents mold growth and maintains protein and complex carbohydrate levels and allows the silage to be ensiled at moisture contents higher than the conventional 60–70%, e.g. at a moisture level over 80% whereby drying is not necessary and alfalfa, grass and cereal silages can be harvested in one pass eliminating one pass with harvesting equipment.

Turning now to the composition herein specifically adapted for preserving wet by product animal feeds such as brewers grain, the composition preferably contains sugar solution in an amount such that the weight ratio of sugar solids to premix ranges from about 1.5:1 to about 3:1. Usually, the composition for use in preserving brewers grain comprises from about 1.0% to about 18% by weight formaldehyde, formic acid in an amount such that the weight ratio of formaldehyde to formic acid ranges from about 1.3:1 to about 1.8:;, preferably from about 1.4:1 to about 1.7:1, methanol in an amount such that the weight ratio of formaldehyde to methanol ranges from about 2:1 to about 6:1, and from about 23% to about 74% by weight sugar solids, preferably added in the form of molasses and from about 5% to about 40% water by weight of the composition. The composition is readily applied, preferably at a level ranging from about 10 to about 20 pounds of composition per ton of brewers grain, e.g. on said grain being conveyed on an auger or conveyor belt or on a pile of the grain. The composition prevents mold growth and bad odor formation and protects protein and complex carbohydrate for at least 90 days whereas mold growth normally would otherwise start within a few days.

The invention is illustrated in the following working examples.

EXAMPLE I

A batch of premix composition is made up consisting of 4 parts by weight 37% formalin (containing 14% methanol) and 1 part by weight 90% formic acid. The batch is prepared by introducing the ingredients into a tank truck equipped with a recirculation pump and recirculation loop and recirculating. Paraformaldehyde does not form in the premix even through it is exposed to freezing temperatures.

EXAMPLE II

A batch of premix is made up as in Example I except 1 part by weight wetting agent is admixed for each 48 parts of premix. The wetting agent utilized is sold under the name Liqui-Lass by Feed Flavors, Inc. and it contains mono- and diglycerides, ethyl butyrate and ethyl acetate. The composition is resistant to paraformaldehyde formation and when applied to dry hay penetrates it and preserves it.

EXAMPLE III

Preservative composition is made up by admixing 3 parts by weight of the premix of Example I, 1 part by weight molasses (79.5 degrees Brix), 1/16 part by weight Liqui-Lass wetting agent (described in Example II) and 3 parts by weight water. The composition is made up by adding the ingredients to a tank truck equipped with a recirculation pump and recirculation loop and recirculating. Minimal formaldehyde odor is detected in the composition.

The preservative composition is applied to alfalfa hay by spraying at the cutter bar at the rate of 7 lbs. 1 oz. per ton of hay (about 3 pounds of premix per ton of hay).

No mold growth is evident even after 5 days despite the 27% moisture content being much higher than the conventional 12% level. Drying to the 27% moisture content saves at least 18 hours compared to drying to the conventional 12% moisture content.

When the preservative composition of this example is poured over alfalfa plants, the product spreads over the entire plants penetrating the leaves and stems. When this is carried out the same except that the wetting agent is left out of the composition, the applied composition beads and runs off the leaves of the plants. This demonstrates that the wetting agent reduces the surface tension of the preservative composition ensuring better feed preservation and mold inhibition.

EXAMPLE IV

Preservative composition is made up by admixing 3 parts by weight of the premix of Example I, 10 parts by weight molasses (79.5 degrees Brix) and 10 parts by weight water. No formaldehyde odor is detected in the composition.

The composition is applied to alfalfa hay (82% moisture level—no drying after cutting) by dumping from buckets at an application rate of 23 pounds per ton of hay (3 pounds of premix per ton of hay).

The treated composition is ensiled. After 4 days have passed, feeding 2000 head of beef cattle is initiated, and this is continued for 30 days at the rate of 30 lbs. per head per day. No mold growth is noted during the 30 day period and no bad odor develops. The dry matter conversion is dramatically improved from a normal average untreated silage ratio of 10 lbs. of feed for 1 lb. of weight gain to a weight gain of 7.8 lbs. of feed for 1 lb. of gain or better (the best conversion was 4.5 lbs. of feed for 1 lb. of gain). Less than 0.1 ppm residual formaldehyde is found in the fat tissue of the cattle fed with the silage.

In another case similar silage is fed to dairy cows. Less than 0.1 ppm of residual formaldehyde is found in the milk.

In the treated silage, dry matter loss amounts to less than 5% compared to 25–35% in untreated silage.

EXAMPLE V

Preservative composition is made up by admixing 5 parts by weight premix of Example I and 10 parts by weight molasses (79.5 degrees Brix). No formaldehyde odor is detected in the composition.

The composition is applied to wet by-product animal feeds, particularly to brewers grain (70% moisture content) and to vegetable wastes at a level of 15 lbs. per ton (3 lbs. of premix per ton) by dumping it on piles of the material being treated.

No mold growth or bad odor is noted 90 days later. On the other hand the control starts to show mold growth in about 36 hours and by the end of the 90 day period is black and fuzzy and has a very strong smell.

In the case of application of preservative composition to vegetable wastes, it was noted that such application reduced fly population by killing fly larvae.

Other variations will be evident to those skilled in the art. Therefore the scope of the invention is intended to be defined by the claims.

What is claimed is:

1. Ruminant feed preservative composition consisting essentially of
(a) first component containing
   (i) from about 25% to about 35% by weight formaldehyde,
   (ii) formic acid in an amount so that the weight ratio of formaldehyde to formic acid ranges from about 1.3:1 to about 1.8:1,
   (iii) methanol in an amount such that the weight ratio of formaldehyde to methanol ranges from about 2:1 to about 6:1, and
   (iv) water
(b) second component which is sugar solution in an amount such that the weight ratio of sugar solids to first component ranges from about 0.2:1 to about 4:1.

2. Composition as recited in claim 1 for application to fodder, said composition containing sugar solution in an amount such that the weight ratio of sugar solids to first component ranges from about 0.2:1 to about 2:1.

3. Composition as recited in claim 1 wherein the sugar solution is molasses.

4. Composition as recited in claim 1 for use as an ensilement additive, said composition containing sugar solution in an amount such that the weight ratio of sugar solids to first component ranges from about 1.5:1 to about 4:1.

5. Composition as recited in claim 4 wherein the sugar solution is molasses.

6. Composition as recited in claim 1 for application to wet by product animal feeds, said composition containing sugar solution in an amount such that the weight ratio of sugar solids to first component ranges from about 1.5:1 to about 4:1.

7. Composition as recited in claim 6 wherein the sugar solution is molasses.

8. Ruminant feed preservative composition consisting essentially of
(a) from about 1.0 to about 18% by weight formaldehyde,
(b) formic acid in an amount so that the weight ratio of formaldehyde to formic acid ranges from about 1.3:1 to about 1.8:1,
(c) methanol in an amount such that the weight ratio of formaldehyde to methanol ranges from about 2:1 to about 6:1,
(d) from about 23% to about 74% by weight sugar solids, and
(e) from about 10% to about 65% by weight water.

9. Ruminant feed preservative composition as recited in claim 8 containing molasses as the source of the sugar solids.

* * * * *